United States Patent
Dusserre-Telmon et al.

(10) Patent No.: US 6,279,852 B1
(45) Date of Patent: *Aug. 28, 2001

(54) DRIVE SYSTEM FOR A PROPELLER DRIVEN TRANSPORT AIRCRAFT

(75) Inventors: Guy Franck Paul Dusserre-Telmon, Sivry-Courtry; Alain Marie Joseph Lardellier, Melun, both of (FR)

(73) Assignee: Societe Nationale d'Etude et de Construction de Moteurs d'Aviation "Snecma", Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,092

(22) Filed: Apr. 16, 1998

(30) Foreign Application Priority Data

Apr. 24, 1997 (FR) .................................................. 97 05058

(51) Int. Cl.[7] .................................................. B64D 35/00
(52) U.S. Cl. .............................................................. 244/60
(58) Field of Search .................................. 244/53 R, 60, 244/58

(56) References Cited

U.S. PATENT DOCUMENTS

| 2,120,821 | * | 6/1938 | Waseige | .................................. 244/60 |
| 2,293,279 | * | 8/1942 | Chilton et al. . | |
| 2,380,889 | * | 7/1945 | Waseige . | |
| 2,414,765 | * | 1/1947 | Platt . | |
| 2,470,155 | * | 5/1949 | Forsyth . | |
| 2,518,841 | * | 8/1950 | Vicent . | |
| 3,136,499 | * | 6/1964 | Kessier | .................................. 244/60 |
| 4,605,185 | * | 8/1986 | Reyes . | |
| 5,106,035 | * | 4/1992 | Langord | .......................... 244/53 R |

FOREIGN PATENT DOCUMENTS

| 0 272 822 A1 | 6/1988 | (EP) . | |
| 719.087 | 2/1932 | (FR) . | |
| 935.413 | 6/1948 | (FR) . | |
| 107573 | * 12/1916 | (GB) | ..................................... 244/60 |
| 536865 | * 5/1941 | (GB) | ..................................... 244/60 |
| 2 120 623 A | 12/1983 | (GB) . | |

* cited by examiner

Primary Examiner—Charles T. Jordan
Assistant Examiner—T. Dinh
(74) Attorney, Agent, or Firm—Oblon, Spivak, McClelland, Maier & Neustadt, P.C.

(57) ABSTRACT

The drive system of a propeller driven transport aircraft has first and second propeller doublets mounted in the plane of the aircraft wings, each propeller doublet including two propellers disposed symmetrically on opposite sides of the central longitudinal axis of the aircraft. The first and second propeller doublets are driven independently of one another by first and second engine units via first and second independent drive trains respectively, the first and second engine units being disposed side by side in the aircraft fuselage.

9 Claims, 3 Drawing Sheets

DRIVE SYSTEM FOR A PROPELLER DRIVEN TRANSPORT AIRCRAFT

BACKGROUND OF THE INVENTION

1. Field of the Invention

The invention relates to a drive system for a propeller driven transport aircraft which is intended to be propelled horizontally, and is particularly applicable to transport aircraft having an even number of propellers greater than or equal to four.

2. Summary of the Prior Art

In propeller driven transport aircraft each propeller is connected to and driven by a propulsion engine. Each engine usually comprises a gas generator and a drive turbine driving a single propeller, and the engine and propeller units are mounted on the aircraft wings.

For satisfactory operation the aircraft must always remain balanced. In particular, in the event of an engine failure the engine stoppage must not lead to the balance of the aircraft being upset by the asymmetrical thrust produced by the engines which are still in operation.

For example, in the case of an aircraft having four turboprop engines disposed symmetrically on the wings on opposite sides of the aircraft fuselage, the engines must be overdimensioned to ensure that the failure of any engine can be compensated for by an increase in the thrust provided by the three engines which are still in operation.

SUMMARY OF THE INVENTION

It is an object of the invention to provide a novel drive system for a propeller driven transport aircraft which can maintain the balance of the aircraft in the event of an engine failure and make it possible to use only two engines to drive four propellers instead of the four engines normally required, so that the cost of the propulsion system is reduced.

Another object of the invention is to provide a drive system for a propeller driven transport aircraft such that even if one engine fails the residual propulsion remains symmetrical.

Yet another object of the invention is to provide a drive system for a propeller driven transport aircraft such that its infrared signature is weaker than in the case of conventional propulsion systems, and engine maintenance costs are lower.

Accordingly, the invention provides a drive system for a propeller driven transport aircraft having a fuselage defining a central longitudinal axis of the aircraft and wings extending from said fuselage on opposite sides of said longitudinal axis, said drive system comprising first and second propeller doublets mounted in the plane of said aircraft wings, each of said first and second propeller doublets comprising two propellers disposed symmetrically on opposite sides of said central longitudinal axis of said aircraft, first and second engine units disposed side by side in said fuselage parallel to said central longitudinal axis, and first and second drive trains respectively connecting said first and second engine units to said first and second propeller doublets whereby said first and second propeller doublets are driven independently of one another by said first and second engine units respectively, each of said first and second drive trains comprising transverse drive shafts and gearboxes through which the two propellers of the respective propeller doublet are drivingly connected to the respective engine unit.

Thus, the invention resides in using two engine units to drive two propeller doublets independently of one another, the propellers of each doublet being arranged symmetrically on opposite sides of the aircraft. The engine units are disposed side by side in the aircraft fuselage and the propeller doublets are driven through two independent drive trains, each of which comprises transverse shafts, which are preferably flexible, interconnecting the propellers of the respective doublet through gearboxes and speed reduction gears providing satisfactory speed adaptation between the engine units and the propellers driven thereby.

Preferably, and especially for military use, the two engines are disposed in the upper part of the fuselage so as to be naturally hidden from detection by any ground-based infrared missile installation and also to protect the engines against intake of foreign bodies from a runway surface not prepared for the take-off and landing of military transport aircraft.

Other preferred features and advantages of the invention will become apparent from the following non-limitative description of the preferred embodiments with reference to the accompanying drawings.

DESCRIPTION OF THE PREFERRED EMBODIMENTS

Figure 1:
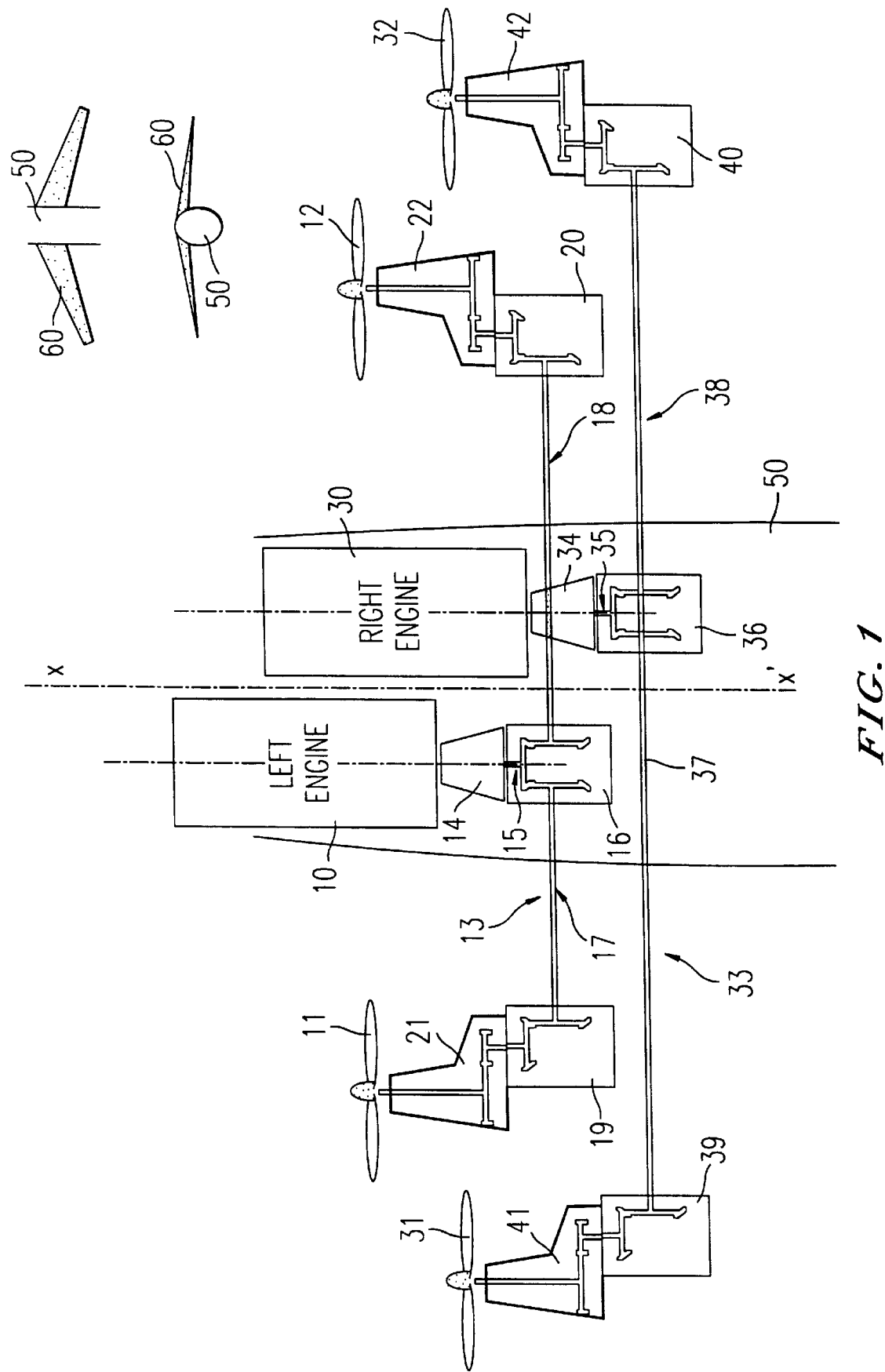
FIG. 1 is a diagrammatic sectional view of a first embodiment of a drive system in accordance with the invention for a transport aircraft having four propellers.
Figure 2:
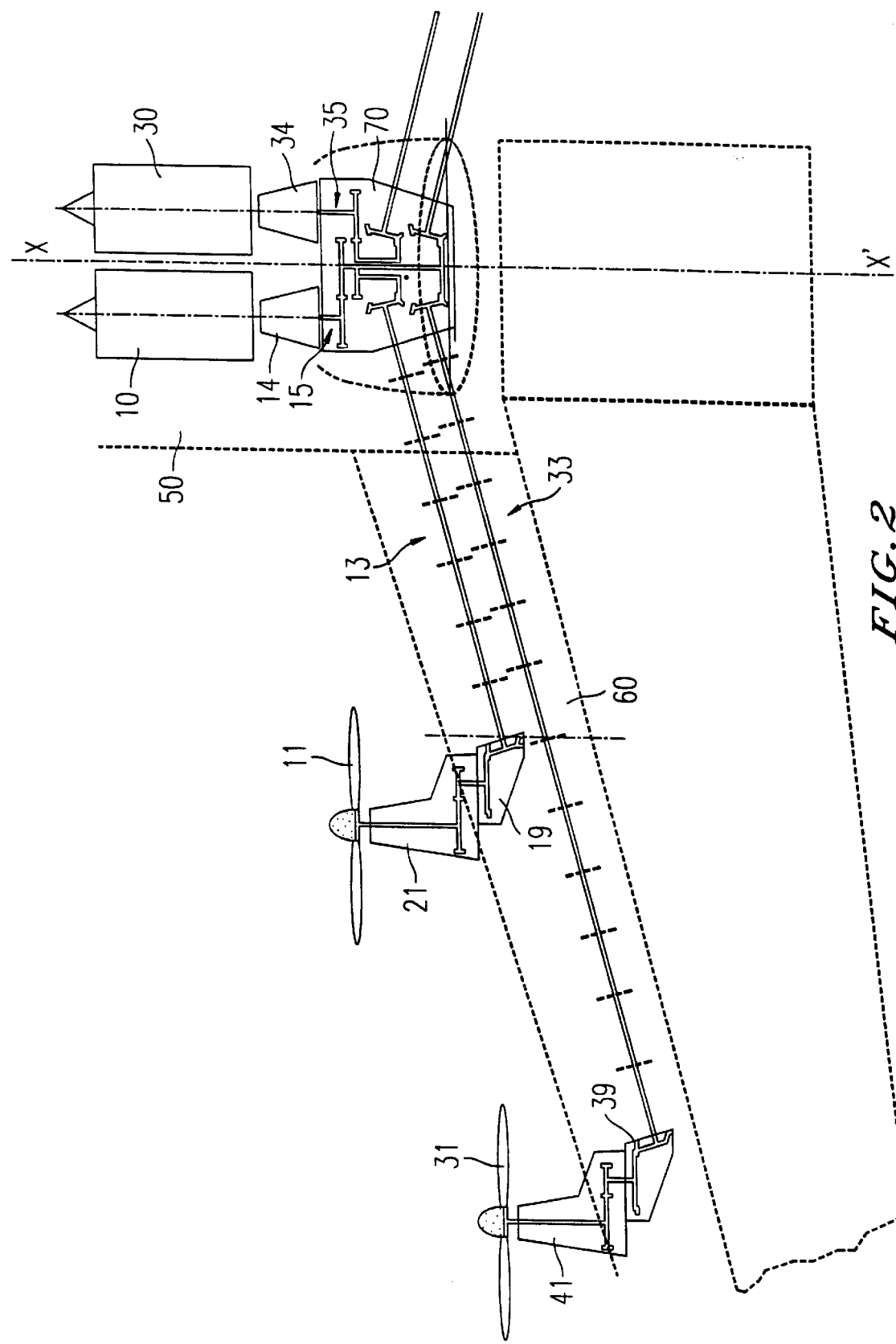
FIG. 2 is a partial sectional view of a second embodiment of a drive system in accordance with the invention for a transport aircraft having four propellers.
Figure 3:
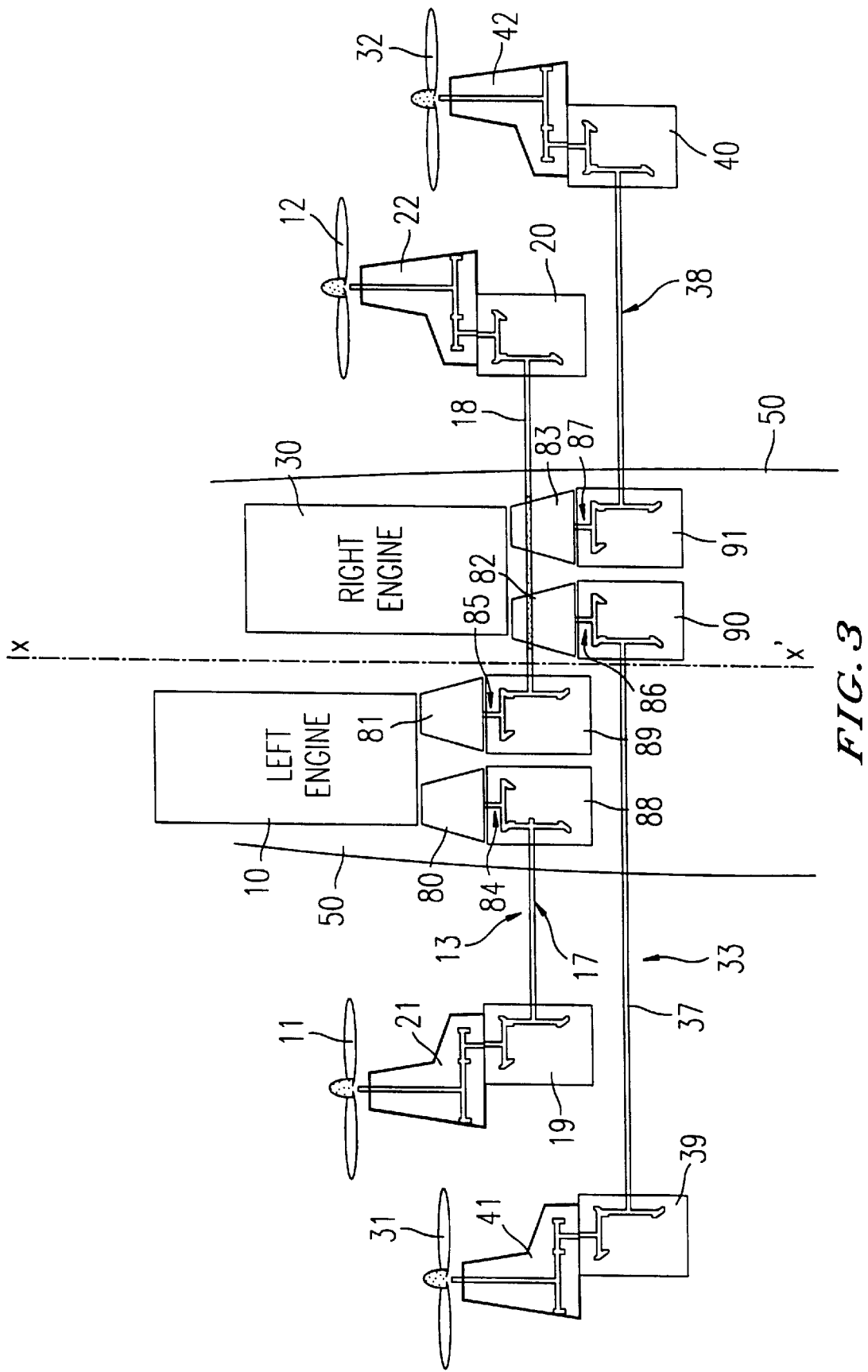
FIG. 3 is a diagrammatic sectional view of a third embodiment of a drive system in accordance with the invention for a transport aircraft having four propellers.

In the various embodiments of the invention shown in FIGS. 1 to 3, the drive system of the transport aircraft comprises a first propeller doublet 11, 12 and a second propeller doublet 31, 32 disposed in the plane of the aircraft wings 60 so that each propeller is oriented for rotation around an axis substantially parallel to the aircraft longitudinal axis XX' to provide a horizontal propulsive force. The two propellers of each propeller doublet are disposed symmetrically on opposite sides of the central longitudinal axis XX'. The first and second propeller doublets 11, 12; 31, 32 are respectively connected to a first engine unit 10 and a second engine unit 30 disposed side by side in an aircraft fuselage 50 and parallel to the aircraft longitudinal axis XX'. Preferably, the two engine units 10, 30 are placed in the upper part of the aircraft fuselage. The first and second engine units 10, 30 drive the first and second propeller doublets 11, 12; 31, 32 respectively through independent first and second drive trains 13 and 33.

Preferably, the engine units 10, 30 are turbojet engines of the kind comprising a gas generator for producing combustion gases which are expanded through at least one drive turbine 14, 34 coupled to a longitudinal turbine shaft 15, 35 mounted for rotation around an axis parallel to the aircraft longitudinal axis XX'. The turbine shafts 15, 35 are connected to the first and second drive trains 13, 33 respectively, which are in turn connected to the first propeller doublet 11, 12 and the second propeller doublet 31, 32 respectively. The drive trains 13, 33 are arranged to transmit the rotational energy of the drive turbines 14, 34 to the propellers, and comprise transverse drive shafts 17, 18; 37, 38 connecting the shafts 15, 35 of the drive turbines to the different propellers 11, 12; 31, 32 through gearboxes. The transverse drive shafts thus enable the two propellers of each doublet to be synchronised. The transverse drive shafts are disposed in the aircraft wings and are preferably flexible so as to follow the wing geometry.

In the first embodiment of the invention shown in FIG. 1, each engine unit 10, 30 comprises a single drive turbine 14, 34 to drive the two propellers of the respective doublet through the respective drive train 13, 33.

The drive train 13 comprises first and second transverse shafts 17, 18 each having a first end connected to the turbine shaft 15 through a first engine gearbox 16, the second end of the shaft 17 being connected to the first propeller 11 through a first propeller gearbox 19, and the second end of the shaft 18 being connected to the propeller 12 through a second propeller gearbox 20. The first engine gearbox 16 connected to the turbine 15 effects a change of drive direction between the shaft 15 and the first and second transverse shafts 17, 18. The first and second propeller gearboxes 19, 20 connected to the propellers 11, 12 respectively effect a change of drive direction between the transverse shafts 17, 18 and the longitudinal rotational axes of the propellers 11, 12. Preferably the propeller gearboxes 19, 20 are associated with first and second speed reduction gears 21 and 22 respectively which serve to control the rotational speed of the propellers 11, 12.

The drive train 33 is identical in construction to the drive train 13, and comprises first and second transverse drive shafts 37, 38 connected to the shaft 35 of the drive turbine 34 through a second engine gearbox 36 and connected to the propellers 31, 32 respectively through third and fourth propeller gearboxes 39, 40 and, preferably, speed reduction gears 41, 42.

The speed reduction gears 21, 22, 41, 42 associated with the propellers enable the working speed of the propellers to be controlled. The gearboxes 19, 20; 39, 40 and the speed reduction gears 21, 22; 41, 42 comprise pinion assemblies so devised that all the propellers are driven in the same direction and at the same speed.

In the event of an engine failing, the residual propulsion of the aircraft remains symmetrical since the engine still in operation continues to drive a propeller doublet which is disposed symmetrically on opposite sides of the aircraft.

FIG. 2 shows a second embodiment of the invention wherein the two drive turbine shafts 15, 35 are connected to the transverse shafts of the two drive trains 13, 33 by way of a single gearbox 70 common to the two drive trains 13, 33. The common gearbox 70 comprises two independent sets of pinions arranged to provide changes of direction between the turbine drive shafts 15, 35 and the transverse shafts. The use of the arrangement of two independent sets of pinions in the common gearbox 70 makes it possible to obtain two independent drive trains as in the first embodiment. However, the second embodiment has the advantage of providing a quasi-symmetrical arrangement for the two drive trains 13, 33.

In the third embodiment of the invention shown in FIG. 3 each engine unit 10, 30 comprises two drive turbines 80, 81; 82, 83, each turbine driving a single propeller by way of a transverse shaft.

The two turbines 80, 81 of the first engine unit 10 are coupled to respective longitudinal turbine shafts 84, 85 mounted for rotation around respective axes parallel to the aircraft longitudinal axis XX'. The turbine shafts 84, 85 are connected to the respective transverse shafts 17, 18 of the first drive train 13 by way of respective gearboxes 88, 89. Although two gearboxes 88, 89 are shown, it is possible to use a single gearbox common to the two connections between the turbine shafts 84, 85 and the transverse shafts 17, 18. As in FIGS. 1 and 2, the drive train 13 is connected to the propellers 11, 12 of the first propeller doublet by way of respective gearboxes 19, 20 and respective speed reduction gears 21, 22.

Similarly, the two drive turbines 82, 83 of the second engine unit 30 are coupled to respective longitudinal turbine shafts 86, 87 which are mounted for rotation around respective axes parallel to the aircraft longitudinal axis XX'. The shafts 86, 87 are connected to the respective transverse shafts 37, 38 of the second drive train 33 by way of respective gearboxes 90, 91. The drive train 33 is connected to the propellers 31, 32 of the second propeller doublet by way of respective gearboxes 39, 40 and respective speed reduction gears 41, 42.

The three embodiments of the invention hereinbefore described all provide symmetrical residual propulsion in the event of an engine failure. Advantageously, the engines can be placed in the upper part of the aircraft fuselage in order to weaken the infrared signature of the engines, and to reduce engine maintenance costs by avoiding the possible intake of foreign bodies disposed, for example, on an inadequately prepared take-off or landing runway.

As will be appreciated, the invention is not limited to the embodiments hereinbefore described. In particular, in the case of the third embodiment, a single common gearbox can be used to connect the two drive turbine shafts of the same engine unit to the respective drive train instead of the two gearboxes 88, 89 and/or the two gearboxes 90, 91.

We claim:

1. A drive system for a propeller driven transport aircraft having a fuselage defining a central longitudinal axis of the aircraft and wings extending from said fuselage on opposite sides of said longitudinal axis, said drive system comprising:

first and second propeller doublets mounted in a plane on leading edges of said aircraft wings, each of said first and second propeller doublets having two propellers disposed symmetrically on opposite sides of said central longitudinal axis of said aircraft, first and second engine units disposed side by side in said fuselage parallel to said central longitudinal axis, and first and second independent drive trains respectively connecting said first and second engine units to said first and second propeller doublets, whereby said first and second propeller doublets are driven independently of one another by said first and second engine units respectively, each of said first and second drive trains having transverse drive shafts and gearboxes through which the two propellers of the respective propeller doublet are drivingly connected to the respective engine unit so that, in the event of one engine unit failing, residual propulsion of the aircraft remains symmetrical since the other engine unit still in operation continues to drive a propeller doublet which is disposed symmetrically on opposite sides of the aircraft.

2. A drive system according to claim 1, wherein said first and second engine units are disposed in an upper part of said aircraft fuselage.

3. A drive system according to claim 1, wherein each of said first and second drive trains includes first and second transverse drive shafts each having first and second ends, and wherein, in each drive train, the first ends of said first and second transverse drive shafts are both connected to the engine unit which drives the respective propeller doublet, the second end of said first transverse drive shaft is connected to one of the propellers of said respective propeller doublet, and the second end of said second transverse drive shaft is connected to the other propeller of said respective propeller doublet.

4. A drive system according to claim 3, wherein the second end of said first transverse drive shaft is connected to said one propeller through a first gearbox connected to said one propeller, and the second end of said second transverse drive shaft is connected to said other propeller through a second gearbox connected to said other propeller.

5. A drive system according to claim 1, wherein said first and second engine units each include at least one drive turbine coupled to a longitudinal turbine shaft mounted for rotation around an axis parallel to said central longitudinal axis of said aircraft, the turbine shaft of said first engine unit being connected to said first drive train, and the turbine shaft of said second engine unit being connected to said second drive train.

6. A drive system according to claim 5, wherein the turbine shafts of said first and second engine units are connected to said first and second drive trains through third and fourth gearboxes respectively.

7. A drive system according to claim 5, wherein the turbine shafts of said first and second engine units are connected to said first and second drive trains through a single gearbox which is common to said first and second drive trains, said common gearbox including two independent pinion assemblies connected one to said first drive train and the other to said second drive train.

8. A drive system according to claim 5, wherein each of said first and second engine units has two drive turbines, each drive turbine being coupled to a respective turbine shaft, and wherein the two turbine shafts of said first engine unit are connected to said first drive train through at least one gearbox, and the two turbine shafts of said second engine unit are connected to said second drive train through at least one gearbox.

9. A drive system according to claim 1, wherein each propeller of said first and second propeller doublets has a speed reduction gear associated therewith.

* * * * *